March 23, 1943. W. LEATHERS 2,314,719
AUTOMATIC METER READING APPARATUS
Filed Aug. 2, 1940
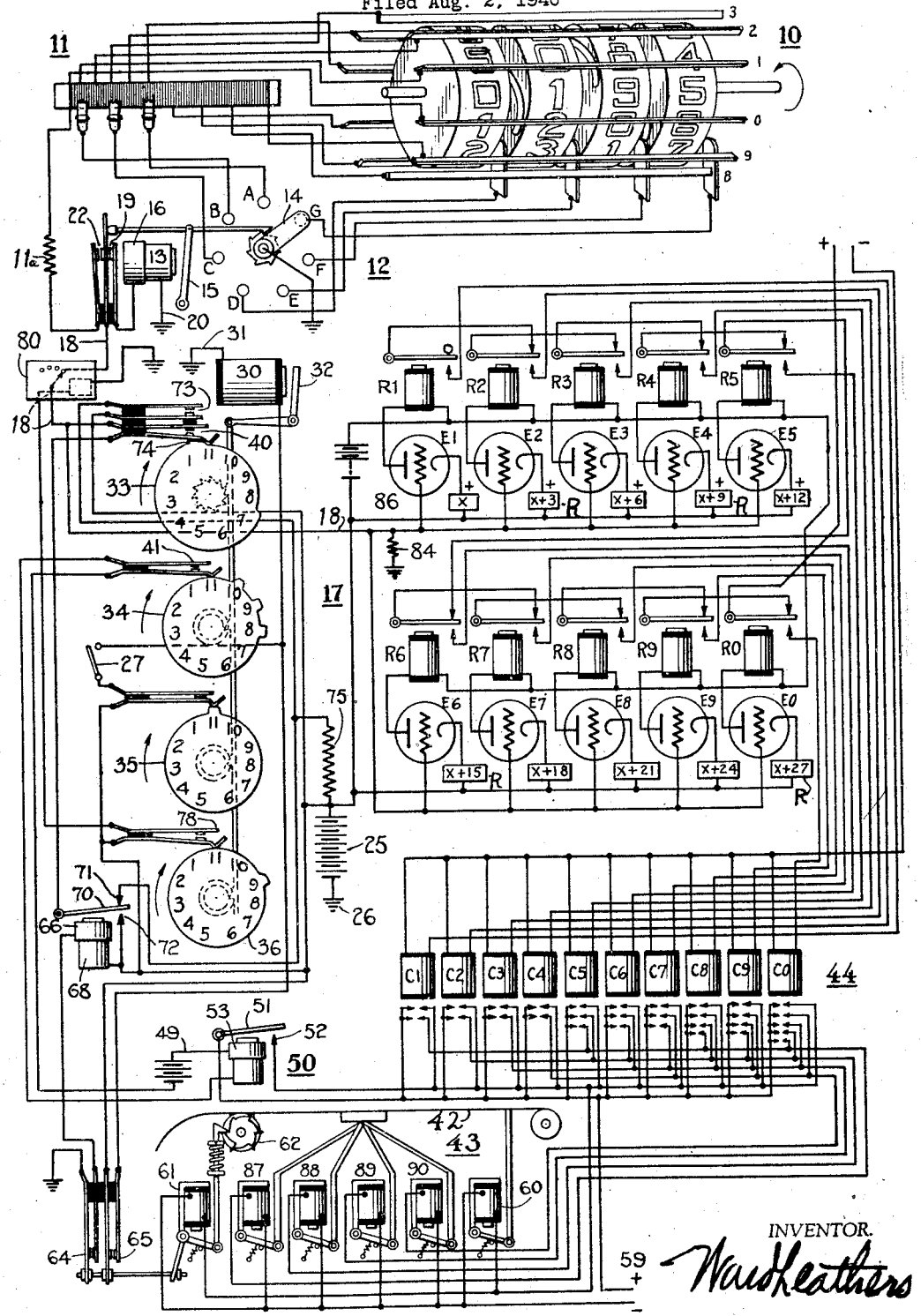
INVENTOR.
Ward Leathers Patented Mar. 23, 1943

2,314,719

UNITED STATES PATENT OFFICE 2,314,719

AUTOMATIC METER-READING APPARATUS

Ward Leathers, Brooklyn, N. Y., assignor, by mesne assignments, to International Business Machines Corporation Application August 2, 1940, Serial No. 349,982

4 Claims. (Cl. 177—351)

The present invention relates to the reading of widely distributed consumption meters, such as for electric current, gas, water or steam from a central reading station by means of an electric wire. The present system has many points in common with the systems shown in my co-pending applications for Letters Patent, Serial Nos. 349,974, filed August 2, 1940, 349,981, filed August 21, 1940, and 331,814, filed April 26, 1940.

The objects of the present invention are, in general, similar to the objects set forth in the above mentioned applications and it is additionally an object of this invention to provide a timing system wherein each timing function awaits the conclusion of a previous function before its commencement. A still further object of the invention is to provide a method of meter reading wherein the operations required for performing certain indexing or selecting functions in no way interferes with the indexing, selecting and recording operations required for reading the meter at the central reading board.

Yet another object of the invention is to provide a means whereby the variable voltage applied to the reading circuit, as determined by a series of resistances selectively receivable in the reading circuit, is caused to actuate certain relays on the reading board at ultra-high speed by electronic discrimination.

In the accompanying drawing forming part of this specification one embodiment of the invention has been disclosed for illustrative purposes. In the drawing, the figure is a diagrammatic view showing a complete telemetric system constructed in accordance with the principles of the invention.

A cyclometer registering mechanism generally characterized by the numeral 10, a resistance having ten taps generally characterized by the numeral 11 and a pulse and read electro-magnetic distributor mechanism generally characterized by the numeral 12 are located in or near the meter. In the pulse and read mechanism 12 in the meter an electro-magnet 13 which periodically indexes or rotates a distributor arm 14 by means of an armature 15 is delayed in its deenergizing by a copper jacket 16. When current reaching the meter from a central station over a combined work and impedance circuit 18 after passing through a closed contact at 19 and stabilizing resistor 11a energizes the electro-magnet 13 and grounds at 20, the armature 15 moves the distributor arm 14 one position, breaks the magnet supply line at 19 and establishes a reading circuit at 22. The time during which the delay jacket 16 holds the contact at 19 broken and the circuit at 22 closed is the time during which the reading function must be accomplished. When this delay action ceases the reading must have been accomplished for the pulsing device 12 is now in condition to receive the impulse for phasing or indexing purposes. Thus the jacket 16 forms a very important link in the timing of the system herein described and the same will be made clearer as the remainder of the timing function is disclosed. Current for the operating of this pulsing-reading system is supplied from a highly constant D. C. source such as a battery 25, one pole of which is grounded at 26. An operating cycle which consists of the reading of one meter is initiated by the closing of a switch 27. If this switch is opened at any time the full reading cycle for one meter will be completed before the mechanism ceases to function. This will presently be made clear. An electro-magnet 30 one side of which is grounded at 31 by means of an armature 32 and suitable ratchet mechanism rotates laminated Bakelite discs 33, 34, 35, 36 in timed relation one step at a time. In the present embodiment I prefer to have eleven positions on this step-by-step mechanism constitute a full cycle. Positions 1, 2 and 3 as indicated on these discs correspond respectively to positions A, B, C, as indicated on the pulsing device 12. Positions 4, 5, 6 and 7 on the discs correspond respectively to positions D, E, F and G on the distributor on the pulsing device 12 in the meter. The disc 33 by means of the contacts 40 maintains a current line through positions 1 to 7 inclusive to pulse and read the meter and breaks said current line at positions 8 to 11 inclusive, during which operations other functions are performed by the discs 34, 35 and 36. The disc 34 by means of the contacts 41 punches blank spaces on the recording tape 42 in a tape perforating recording mechanism generally characterized by the numeral 43. This recording mechanism is actuated by current over lines from a coding mechanism generally characterized by the numeral 44 all of which is so fully set forth in my co-pending application for Letters Patent, Serial No. 331,814 as to require little further description here. Impulses through the contacts 41 are provided by the disc 34 for the positions 8, 9 and 10. When these impulses are made, current from a suitable source such as a battery 49 actuates an electro-magnet 50 which is substantially a telephone type relay having an armature 51 for closing a secondary circuit at 52 and being provided with a copper jacket 53 for delaying the action of closing. This secondary circuit, provided with a current supply at 59, actuates a perforating magnet 60 which perforates drive holes in the tape 42 by means of a perforating punch 60' and the electro-magnet 61 which advances the tape by means of the drive mechanism 62. Thus spaces appear between the recordings of the registered consumption figures and of the identifying numbers of the next meter as the meters are read and recorded. The need and reason for the delay action at 53 is to give the punches time to clear themselves from the tape before the next operation begins. This is necessary because every time the magnet 60 is actuated the magnet 61 is also actuated whereby contacts 64 and 65 are closed and the latter contact causes the coil 30 to be energized to step the discs 33, 34, 35, and 36 one position. Upon movement of the disc 34, the contacts 41 are closed, thus closing the circuit to the relay 50 which in turn closes a circuit through the magnets 60 and 61. Since the punch 60' is still in the tape a delay in starting action is given to magnet 50, by means of the copper jacket 53. This allows the punch 60' to be withdrawn and the tape 42 advanced before the next space is indicated.

The need for a similar delay device 66 on the coil 68 is to give the armature 15 on coil 13 time to spring back to normal. Then the coil 13 is prepared to receive another pulse which initiates the reading the next numeral. The delay is enough to prevent armature 70 from closing until armature 15 is back to normal. Contact 71 serves the reading function by keeping a resistor 75 in the reading circuit extending from the contact 71 through contacts 41, long line 18, contacts 22, and all or a portion of the resistance 11. Contact 72 serves the pulsing function by shunting the resistance 75 out of the circuit and thereby increasing current flow.

The disc 35 is for the purpose of closing a circuit to permit starting the system. If the switch 27 is open the system will proceed to function until position 11 on the discs is reached. Then the system will pause until the switch 27 is closed. When the switch 27 is closed, current from the battery 25 energizes the coil 30 and the latter drives the discs to position 1. A projection 74 on the disc 33 closes contacts 73 pulsing coil 13. It should be noted that this is done merely by shorting the resistor 75 out of the reading circuit. With it in the circuit the coil 13 does not receive enough energy to become actuated. The projection 74 is between positions 11 and 1 only on the discs, closing the circuit through the contacts 73 only while discs pass from position 11 to position 1. The discs are now on position 1, and although contact 73 is open contact 40 is still closed. The coil 13 is now held by jacket 16 in reading position and the resistor 75 is now back in the circuit. The relationship in resistance between resistor 75 and the selected portion of the resistance unit 11 in the meter (which is one of ten and corresponds to one of ten digits) causes one of ten circuits to be closed in the reading board 17 by means hereinafter to be made clear. The numeral is coded in unit 44 and recorded by unit 43. During the punching operation the contacts 64 and 65 are closed. Contact 64 closes a circuit through coil 68 but does not actuate it immediately because of delay action caused by jacket 66. Contact 65 causes current to flow in coil 30 which advances the discs to position 2. The delay at 66 is sufficient to allow the delay at 16 on coil 13 to spend itself thus releasing armature 15 before armature 70 is attracted. Therefore, after armature 15 is back to normal position, putting the coil 13 in pulsing position by closing contact 19, the armature 70 is attracted to contact 72 thus shunting resistor 75 out of the reading circuit leading to the resistance 11 and causing coil 13 to go to position 2. During the above described operation the armature 15, upon moving to its normal position, causes the contacts 22 to become open thus breaking the reading circuit passing through the long line 18. Breaking of the reading circuit disconnects the reading board instrumentalities in a manner that will appear presently to deenergize the recorder coils at 43 and cause the various punches to be withdrawn from the recording tape 42. The armature 15, being held by its delay mechanism 16 permits the second numeral to be read in the manner previously described in connection with the reading of the first numeral. All seven numerals are read in similar manner. When the seventh numeral is read the magnet 61 in the recorder 43 closes the contacts 64 and 65. Closing contact 65 causes coil 30 to advance the discs to position 8. The disc 33 causes contact 40 to open, thus breaking the reading and pulsing circuit to the coil 13. The disc 34 closes contact 41 and proceeds to energize coil 50. Coil 50 is delayed in energizing by delay jacket 53. This gives any punch in the recording mechanism 43 time to clear itself from the tape where it was punching the seventh numeral. When the armature 51 is attracted it closes the tape spacing circuit and coils 60 and 61 serve to advance the tape. This causes contact 65 to close, thus energizing coil 30 and stepping the discs up to position 9. This operation repeats until the discs reach position 11. At position 9 the disc 36 closes the contact 78. This pulses a selector 80 by means of which the entire system is shifted into another meter circuit and the next meter is automatically read without interruption in a similar manner as soon as the discs 33, 34, 35 and 36 reach their initial position 1 providing the switch 27 is closed. When the meter is completely read, distributor arm 14 is at position G where it normally remains for a month, or until the next reading.

An electronic discriminator is designated in its entirety at 17 and involves in its general organization ten electronic circuits, one for each of ten digits, i. e. 1—2—3—4—5—6—7—8—9—0, complete with vacuum tubes, batteries, and sensitive relays or other electronic or other means of amplification that may be desired. Such an apparatus has been fully disclosed in my above noted copending application for Letters Patent, Serial No. 349,981. Each of these ten tubes is provided with a bias, generally characterized by the algebraic designation or letter X, so that, beginning with the first tube, each successive tube has a bias of three volts more than the previous one. These biases may be obtained by means of batteries or they may be obtained by placing a resistor R such as are indicated at "X", "X+3", "X+6", etc. in the cathode circuit of each tube as shown. A minimum bias resistor 84 is positioned in the common grid circuit of the various tubes. The bias, over and above the minimum bias, is applied to each tube in such a manner that the grid is made negative with respect to the cathode. Each of the circuits is provided with a sensitive relay $R_1$ to $R_0$ inclusive. The primary circuits of these relays are in the plate circuits of the tubes. They are adjusted so that they operate when their associated tubes pass a predetermined amount of current through their plate circuits. If the plate circuit passes more current they will also operate. If, however, the plate circuit passes less current they will not operate. The plate current in each tube is directly dependent upon the grid voltage with respect to the cathode. The more positive the grid with respect to the cathode the more plate current; the more negative the grid with respect to the cathode the less plate current. For simplicity, let it be assumed that the relays will operate on the plate current that is passed by the tubes when the grid is at zero potential with respect to the cathode. To accomplish his as in circuit $E_1$, a positive potential of X volts must be impressed on the grid of the associated tube. This neutralizes the negative potential of X volts that the bias has already given the grid, and the resultant grid potential becomes zero with respect to the cathode. In circuit $E_2$ a positive potential of $X+3$ volts is needed on the grid. All the grids are electrically joined together and connected by means of the line 18 to the meter. If contact 22 is closed, the circuit follows through the resistor 11 or part thereof to the cyclometer 10, then to the distributor arm 14, thence to ground. Back in the central reading station the circuit continues from ground 26 to a battery 25, to a resistor 75, through contacts 71 thence through contacts 40 on disc 33 to the junction 86. Each of the ten resistance values in the resistor 11 in the meter is calculated to neutralize the bias applied to one of the grids of the tubes in the reading board. Since the resistor 75 has a fixed resistance value which is placed in series with one of the ten values of the resistor 11 in the meter, ten substantially fixed and predetermined values are available for electronic reading purposes. The ratio of the value of the resistor 75 to the sum of the values of 75 and 11 is the fraction of the voltage of the battery 25 that will appear at junction 86 (across the resistor 75). Varying the resistor 11 varies the ratio, thus varying the voltage. The line from the junction 86 is joined between the two resistance elements just mentioned and therefore imposes upon the grids of all the tubes a voltage corresponding to the numeral to be read in the meter. These voltages cause all relays, from $R_1$ to and including the one whose associated tube has a neutralized (zero potential) grid, to operate. The contacts and armatures of these relays are interconnected in such a way that only the output circuit of the relay, whose associated tube has a zero potential grid, will be completed to the coding unit 44; that is, if a potential of $X+9$ volts is applied at 86, relays $R_1$, $R_2$, $R_3$ and $R_4$ will operate. $R_2$ will break the output circuit of $R_1$; $R_3$ will break the output circuit of $R_2$ and $R_4$ will break the output circuit of $R_3$. Therefore $R_4$ is the only relay whose output circuit has been completed. This will actuate coil number $C_4$ in the coding unit 44. Coil $C_4$ when operated will complete the circuits of punching coils 89 and 90. These will now punch in code the numeral 4 on the tape 42. Coil $C_4$ also closes the circuits of coils 60 and 61 in the recorder 43. These provide for the means of advancing the tape 42 after the numeral has been punched. Different digits have different codings and all ten digits are taken care of by one or more of the punching coils 87, 88, 89 and 90. The electronic discriminator 17 just described is similar in many respects to the electronic discriminator shown in my above mentioned copending application, Serial No. 349,981, and reference may be had thereto for a full disclosure of the principle upon which the present electronic discriminator operates.

The actual coding utilized is immaterial insofar as the present invention is concerned. For illustrative purposes, however, one system of coding that may be employed is shown in my co-pending application for Letters Patent, Serial No. 331,814, above mentioned. Briefly, the system of coding employed herein serves to translate readings which are expressed in terms of Arabic numerals into special perforations arranged in four rows on the tape 42.

What is claimed is:

1. In an apparatus for exhibiting at a remote point the relative positions of a series of movable members, a plurality of resistances of progressively increasing values which correspond to different positions capable of being assumed by the movable members, each succeeding resistance being inclusive of the preceding resistances, an impedance circuit, a distributor switch for separately and successively connecting said resistances in said circuit, means operable by movement of the movable members for actuating the switch, means in said circuit establishing a potential differential commensurate with the impedance value of the circuit, a plurality of reading circuits, means responsive to said potential differential for selectively closing said reading circuits, and exhibiting instrumentalities operatively connected to said reading circuits.

2. In an apparatus for exhibiting at a remote point the relative positions of a series of movable members, a plurality of resistances the values of which are correlated with the various positions capable of being assumed by the movable members, an impedance circuit, means for successively and separately connecting said resistances in said circuit in accordance with the position of the movable members, means in said circuit establishing a potential differential commensurate with the impedance value of the circuit, a plurality of reading circuits, means responsive to said potential differential for selectively closing said reading circuits, a coding solenoid connected in each reading circuit, secondary circuits adapted to be closed by said coding solenoids, and exhibiting mechanism operable upon closing of said secondary circuits to display the position of the rotary dial.

3. In a meter reading apparatus for meters having a rotary member, a plurality of signaling resistances of progressively increasing values, each succeeding resistance being inclusive of the preceding resistances, an impedance circuit, means for successively and separately connecting said resistances in said circuit in accordance with the position of the rotary member, means in said circuit establishing a potential differential commensurate with the impedance value of the circuit, a plurality of reading circuits, means responsive to said potential differential for selectively closing said reading circuits, and exhibiting instrumentalities operatively connected to said reading circuits.

4. In an apparatus for automatically indicating at a remote point the relative positions of a plurality of movable members, a combined work and impedance circuit including a fixed resistance, a variable impedance circuit for each movable member means for varying the impedance value of each variable impedance circuit in accordance with the positions assumed by each movable member, a selector mechanism for separately and successively selecting said variable impedance circuits for connection to the work and impedance circuit, a solenoid disposed in the work and impedance circuit for periodically actuating the selector mechanism, said solenoid being responsive only to current impulses of a predetermined magnitude for its operation, a current source connected to the work and impedance circuit for establishing a potential differential across said resistance, exhibiting instrumentalities operable upon establishing of said potential differential across the resistance to display the impedance value of a selected circuit, said exhibiting instrumentalities being operable to short the resistance from the work and impedance circuit whereby current supplied to the latter is sufficient to energize the solenoid and operate the selector mechanism, and means operable upon energization of the solenoid for completing the connection between the work and impedance circuit and the selected variable impedance circuit.

WARD LEATHERS.